United States Patent

Schwerzel et al.

Patent Number: 5,041,495
Date of Patent: Aug. 20, 1991

[54] AQUEOUS SECONDARY DISPERSION CONTAINING PHOSPHATE GROUPS

[75] Inventors: Thomas Schwerzel, Ludwigshafen; Gerhard Auchter, Mannheim; Eckehardt Wistuba, Bad Duerkheim, all of Fed. Rep. of Germany

[73] Assignee: BASF Aktiengesellschaft, Ludwigshafen, Fed. Rep. of Germany

[21] Appl. No.: 563,664

[22] Filed: Aug. 6, 1990

Related U.S. Application Data

[63] Continuation of Ser. No. 235,618, Aug. 24, 1988, abandoned.

[30] Foreign Application Priority Data

Aug. 29, 1987 [DE] Fed. Rep. of Germany ....... 3728992

[51] Int. Cl.$^5$ ............................................. C08L 43/00
[52] U.S. Cl. ................................... 524/807; 524/824; 524/833
[58] Field of Search ................... 524/807, 824, 833

[56] References Cited

U.S. PATENT DOCUMENTS 4,487,859 12/1984 Martino ............................. 523/406

FOREIGN PATENT DOCUMENTS 0037150 10/1981 European Pat. Off. ........... 524/807

Primary Examiner—Joseph L. Schofer
Assistant Examiner—J. M. Reddick
Attorney, Agent, or Firm—Keil & Weinkauf

[57] ABSTRACT

Aqueous secondary dispersions containing phosphate groups are obtainable by copolymerization of
(A) 25-98% by weight of acrylates and/or methacrylates,
(B) 1-10% by weight of acrylic and/or methacrylic acid,
(C) 1-8% by weight of a compound of the general formula

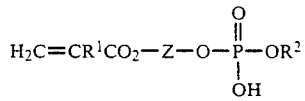

where $R^1$ and $R^2$ are each hydrogen and/or a $C_1$-$C_8$-hydrocarbon radical and Z is a straight-chain or branched $C_1$-$C_8$-alkylene, and
(D) 0-60% by weight of a copolymerizable olefinically unsaturated compound, in an organic solvent, neutralization of the copolymer solution and dilution with water and, if required, removal of solvent by distillation.

11 Claims, No Drawings

AQUEOUS SECONDARY DISPERSION CONTAINING PHOSPHATE GROUPS

This application is a continuation of application Ser. No. 07/235,618, filed on Aug. 24, 1988 now abandoned.

The present invention relates to aqueous secondary dispersions which contain phosphate groups and are based on acrylate copolymers, a process for their preparation and their use for the preparation of paints filled with active pigments.

Emulsifier-free active secondary dispersions are known and are prepared from carboxyl-containing copolymers by partial or complete neutralization of the carboxyl groups with ammonia, amines or alkali metal hydroxides followed by dispersion in water. For example, German Laid-Open Application DOS 3,543,361 describes a process for the preparation of aqueous polymer dispersions by copolymerization of an ester of acrylic acid or methacrylic acid with copolymerizable olefinically unsaturated compounds having one or more carboxyl or carboxylic anhydride groups and, if required, further copolymerizable olefinically unsaturated compounds, subsequent copolymerization of further components, dispersion of the resulting mixture in water with the addition of ammonia and, if required, removal of the solvent by distillation.

These electrocratically stabilized secondary dispersions are generally not very stable in the presence of polyvalent cations and tend to coagulate. This has to date prevented the use of active anticorrosion pigments, such as zinc phosphate, which dissociate to form, for example, $Zn^{2+}$ ions in an aqueous medium.

It is an object of the present invention to provide secondary dispersions which also remain stable in the presence of active pigments.

We have found that this object is achieved by aqueous secondary dispersions which contain phosphate groups and are obtainable by copolymerization of (A) 25–98% by weight of acrylates and/or methacrylates,
(B) 1–10% by weight of acrylic and/or methacrylic acid,
(C) 1–8% by weight of a compound of the general formula

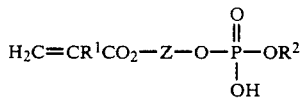

where $R^1$ and $R^2$ are each hydrogen and/or a $C_1$–$C_8$-hydrocarbon radical and Z is a straight-chain or branched $C_1$–$C_8$-alkylene, and
(D) 0–60% by weight of a copolymerizable olefinically unsaturated compound, in an organic solvent, neutralization of the copolymer solution and dilution with water and, if required, removal of solvent by distillation.

The present invention furthermore relates to the use of aqueous secondary dispersions as coating materials and, in combination with active pigments with or without further assistants, as paints.

Suitable components (A) are esters of acrylic and/or methacrylic acid of straight-chain or branched alcohols of 1 to 20 carbon atoms, such as methyl acrylate, ethyl acrylate, isopropyl acrylate, methyl methacrylate, n-butyl acrylate, n-butyl methacrylate, isobutyl acrylate, isobutyl methacrylate, tert-butyl acrylate, 2-ethylhexyl acrylate, 2-ethylhexyl methacrylate or lauryl acrylate or a mixture of these. n-Butyl methacrylate and methyl methacrylate are preferred. The component (A) is used in an amount of from 25 to 98, preferably from 25 to 60, % by weight.

Acrylic and/or methacrylic acid are used as component (B), in an amount of from 1 to 10, preferably from 2 to 7, % by weight.

Components (C) used are, for example, monoesters of phosphoric acid with compounds which are obtainable from diols and acrylic acid or methacrylic acid by monoesterification, such as 2-hydroxyethyl methacrylate, hydroxypropyl (meth)acrylate, 4-hydroxybutyl acrylate and 2-hydroxybutyl acrylate.

2-hydroxybutyl (meth)acrylate is preferably used.

The component (C) is used in an amount of from 1 to 8, preferably from 2 to 6, % by weight.

Components (D) are further copolymerizable olefinically unsaturated compounds not mentioned under (A) to (C). They are, for example, mono(meth)acrylates of diols, such as hydroxyethyl acrylate and hydroxypropyl (meth)acrylate and butanediol mono(meth)acrylate, (meth)acrylamide and/or (meth)acrylonitrile. These monomers can, if required, be used for obtaining specific properties.

Components (D) which may be present are: Vinylaromatics, such as styrene and vinyltoluene, vinyl ethers, vinyl esters, diesters of maleic acid, itaconic acid, citraconic acid or mesaconic acid with monoalcohols of 1 to 20 carbon atoms which may contain ether or thioether groups. Other suitable components (D) are monoolefins of 3 to 20 carbon atoms, such as propene, butene, pentene, hexene or isobutene, and diolefins, such as butadiene and isoprene.

It is known that polar functional groups, as may be present in component (D), for example hydroxyl or ether groups, additionally stabilize polymer dispersions. However, the novel dispersions do not require such additional stabilization. Polar groups present in component (D) may, however, adversely affect the water resistance of the films obtained from the novel dispersions. In the preferred embodiment of the invention, component (D) is not present. Where component (D) is present, from 20 to 60% by weight of vinylaromatics have proven useful.

The sum of the percentages stated under (A) to (D) is 100.

The process of solution polymerization is familiar to the skilled worker, so that there is no need to discuss here the conditions suitable for the particular components. The polymerization is advantageously carried out in the presence of 0.3 to 5.0% by weight, based on the sum of the monomers (A) to (D), of free radical initiators, such as azobiscarboxamides, azobiscarbonitriles or peroxides, in general at from 50° to 150° C., preferably from 80° to 130° C., in the presence or absence of a regulator, such as mercaptoethanol, tert-dodecyl mercaptan or diisopropylxanthogen disulfide, which may be present in amounts of from 0 to 3% by weight, based on the sum of the monomers (A) to (D). Suitable organic solvents are the solvents which are conventionally used in coating technology and which dissolve the novel polymer. A solvent content is not necessary for stabilization and advantageous performance characteristics of the novel dispersions and, for environmental protection reasons, it is useful to keep the content of solvent as low as possible. Advantageously used solvents are those which, owing to their boiling point and/or azeotrope formation with water, can readily be distilled off from the novel dispersions. Butanol, isobutanol, propanol, ethanol, methyl isobutyl ketone, toluene and xylene are particularly preferred.

The copolymer solutions are either converted into dispersions or solutions by mixing with aqueous ammonia solution and dilution with water, or are stirred slowly into an aqueous ammonia solution to give a dispersion or solution. Solvent is, if necessary, removed from the dispersions by distillation, preferably under reduced pressure, and the solvent can be recovered.

For each acid equivalent of the copolymer, from 0.1 to 1.5, preferably from 0.5 to 1.0, particularly preferably from 0.4 to 1.0, equivalents of base are added as a neutralizing agent. The pH of the dispersions can accordingly be about 6.8–10, preferably 7.0–9. A small part, advantageously not more than 25, preferably not more than 10, % by weight, of the ammonia required for neutralization can be replaced by organic amines, in particular triethylamine or dimethylethanolamine, in order to achieve special effects. Such additives can increase the water swellability and the water permeability of the paints.

The polymer content of the novel dispersions is advantageously chosen so that the resulting viscosity is favorable for the processor. The polymer content is in general from 40 to 60, preferably from 45 to 55, % by weight.

The dispersions prepared according to the invention can be used as the sole binder for the preparation of the paints. No dispersion assistants are required for incorporating pigments and fillers, as are necessary for the preparation of conventional emulsion paints. The novel dispersions can be pigmented by simply stirring in the pigments and fillers. For the preparation of paints, conventional pigments and fillers, such as titanium dioxide, iron oxides, chromium oxides, barium sulfate, carbon black, calcite, dolomite, talc, aluminum bronze and organic pigments and preferably active pigments, such as zinc phosphate, zinc molybdenum phosphate, zinc borate and zinc chromate, may also be used. However, other assistants conventionally used in coating technology, such as antifoams, wetting agents, antisettling agents, thixotropic agents, thickeners, lubricants and plasticizers, may also be employed.

Coating materials and paints prepared using the novel secondary dispersions can be processed by conventional methods, such as brushing, spraying, casting, immersion and coating with the hard or soft roller. The novel products are used, for example, as pigmented paints for the protection of various substrates, such as steel, galvanized iron and other metals, such as zinc or aluminum.

EXAMPLE 1

173 g of isobutanol were heated to 100° C., while stirring. A mixture of 90 g of styrene, 102 g of n-butyl acrylate, 36 g of acrylic acid, 12 g of an ester of 1 mole of hydroxyethyl methacrylate and 1 mole of orthophosphoric acid and 2.9 g of tert-butyl peroctoate in 5.8 g of isobutanol was added dropwise in the course of 30 minutes. The temperature was kept at 100° C. for a further 45 minutes. A mixture of 174 g of styrene, 186 g of n-butyl acrylate, 3.6 g of tert-butyl peroctoate and 7.2 g of isobutanol was then added dropwise in the course of 3 hours. A further 7.2 g of tert-butyl peroctoate in 14.4 g of isobutanol were added, after which the mixture was diluted with 200 g of isobutanol. 50 g of concentrated aqueous ammonia solution were added, followed by 450 g of water. During distillation under reduced pressure (60° C. and under 50 mbar), a further 760 g of water were run in.

Solids content: 46% by weight.

EXAMPLE 2

173 g of isobutanol were heated to 100° C., while stirring. A mixture of 96 g of styrene, 108 g of n-butyl acrylate, 24 g of acrylic acid, 12 g of an ester of 1 mole of hydroxyethyl methacrylate and 1 mole of orthophosphoric acid, 2.9 g of tert-butyl peroctoate and 5.8 g of isobutanol was added dropwise in the course of 30 minutes. The temperature was kept at 100° C. for a further 45 minutes. A mixture of 174 g of styrene, 186 g of n-butyl acrylate, 3.6 g of tert-butyl peroctoate and 72 g of isobutanol was then added dropwise in the course of 3 hours. 7.2 g of tert-butyl peroctoate in 14.4 g of isobutanol were then added, after which the mixture was diluted with 23 g of isobutanol. 36.4 g of concentrated ammonia were added, followed by 424 g of water. During distillation under reduced pressure (at 60° C. and under 50 mbar), a further 760 g of water were run in.

Solids content: 40% by weight.

COMPARATIVE EXAMPLE 173 g of isobutanol were heated to 100° C., while stirring. A mixture of 96 g of styrene, 108 g of n-butyl acrylate, 36 g of acrylic acid, 2.9 g of tert-butyl peroctoate and 5.8 g of isobutanol was added dropwise in the course of 30 minutes. The temperature was kept at 100° C. for a further 45 minutes. A mixture of 174 g of styrene, 186 g of n-butyl acrylate, 3.6 g of tert-butyl peroctoate and 7.2 g of isobutanol was then added dropwise in the course of 3 hours. 7.2 g of tert-butyl peroctoate in 14.4 g of isobutanol were then added, after which the mixture was diluted with 57 g of isobutanol. 40.8 g of concentrated ammonia were added, followed by 419 g of water. During distillation under reduced pressure (at 60° C. and under 50 mbar), a further 398 g of water were run in.

Solids content: 46.6% by weight. Test of stability to active pigment:

Experiment 1

30 g of zinc molybdenum phosphate were stirred into 100 g of the dispersion from Example 1. The sample showed no change even after storage for several weeks.

Experiment 2

30 g of zinc molybdenum phosphate were stirred into 100 g of the dispersion from Example 2. The sample showed no change even after storage for several weeks.

COMPARATIVE EXPERIMENT 30 g of zinc molybdenum phosphate were stirred slowly into 100 g of the dispersion from the Comparative Example. The dispersion coagulated.

EXAMPLE 3

Preparation of a paint 60 g of water, 2 g of a corrosion inhibitor (1:1 benzoic acid/sodium nitrite), 2 g of sodium polyacrylate, 2 g of a preservative (isothiazolinone), 100 g of 50% strength by weight styrene/acrylate dispersion, 10 g of mineral spirit (boiling point 180°–210° C.) and 3 g of a siliconebased antifoam were premixed in a dissolver. 109 g of Tremin 283/400 AST (filler based on quartz), 83 g of iron oxide red 130M and 100 g of zinc molybdenum phosphate were added, and the mixture was milled in a ball mill. 485 g of 50% strength by weight styrene/acrylate dispersion and 3 g of antifoam (based on mineral oil) were then added.

We claim:

1. An aqueous secondary dispersion containing phosphate groups and intended for use in paints, obtained by
   1) copolymerization of components consisting essentially of
      (A) 25–98% by weight of acrylates, methacrylates or mixtures thereof
      (B) 1–10% by weight of acrylic acid, methacrylic acid or mixtures thereof,
      (C) 1–8% by weight of a compound of the formula

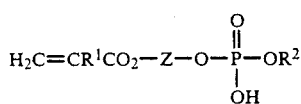

where $R^1$ and $R^2$ independently are hydrogen or a $C_1$–$C_8$-hydrocarbon radical and Z is a straight-chain or branched $C_1$–$C_8$-alkylene, and
      (D) 0–68% by weight of a vinylaromatic compound, in an organic solvent,
   2) neutralization of the copolymer solution and
   3) dilution with water.

2. A secondary dispersion as defined in claim 1, obtained using a component (C) where $R^1$ is $CH_3$ and $R^2$ is hydrogen.

3. A secondary dispersion as claimed in claim 1, obtained using styrene as component (D).

4. A secondary dispersion as claimed in claim 1, obtained by neutralization of the copolymer solution with aqueous ammonia solution.

5. A paint containing a secondary dispersion as defined in claim 1.

6. A paint containing a secondary dispersion as defined in claim 1 and active pigments with or without further assistants.

7. A coating material for coating substrates, containing a paint as defined in claim 6.

8. A coating material for coating metals, containing a paint as defined in claim 6.

9. A secondary dispersion as defined in claim 1, wherein the organic solvent is removed by distillation.

10. An aqueous secondary dispersion as defined in claim 1, where the amount of component A in the copolymer is 25–60% by weight and the amount of component D in the copolymer 20–60% by weight.

11. A process for preparing an aqueous secondary dispersion containing phosphate groups and intended for use in paints which comprises (1) copolymerizing components consisting essentially of
    (A) 25–98% by weight of acrylates, methacrylates or mixtures thereof
    (B) 1–10% by weight of acrylic acid, methacrylic acid or mixtures thereof,
    (C) 1–8% by weight of a compound of the formula

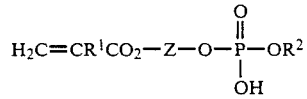

where $R^1$ and $R^2$ independently are hydrogen or a $C_1$–$C_8$-hydrocarbon radical and Z is a straight-chain or branched $C_1$–$C_8$-alkylene, and
    (D) 0–68% by weight of a vinylaromatic compound, in an organic solvent, (2) neutralizing the copolymer solution and (3) diluting the neutralized copolymer solution with water.

* * * * *

UNITED STATES PATENT AND TRADEMARK OFFICE
CERTIFICATE OF CORRECTION

PATENT NO. : 5,041,495

DATED : August 20, 1991

INVENTOR(S) : Thomas SCHWERZEL et al.

It is certified that error appears in the above-identified patent and that said Letters Patent is hereby corrected as shown below:

Claim 3, Column 5, Line 40:

Please delete "claimed" and insert --defined--

Claim 4, Column 6, Line 1:

Please delete "claimed" and insert --defined--

Signed and Sealed this

Fifth Day of January, 1993

Attest:

DOUGLAS B. COMER

Attesting Officer

Acting Commissioner of Patents and Trademarks